(12) United States Patent
Zhuang et al.

(10) Patent No.: US 8,542,202 B2
(45) Date of Patent: Sep. 24, 2013

(54) ELECTRONIC DEVICE AND METHOD FOR DETERMINING A TOUCH INPUT APPLIED TO A CAPACITIVE TOUCH PANEL SYSTEM INCORPORATED THEREIN

(75) Inventors: Zhiming Zhuang, Kildeer, IL (US);
William P. Alberth, Jr., Prairie Grove, IL (US); Ken K. Foo, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 703 days.

(21) Appl. No.: 12/650,789

(22) Filed: Dec. 31, 2009

(65) Prior Publication Data
US 2011/0157069 A1    Jun. 30, 2011

(51) Int. Cl.
*G06F 3/045* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| 2002/0089491 | A1* | 7/2002 | Willig ............................ 345/173 |
| 2005/0134292 | A1 | 6/2005 | Knoedgen |
| 2007/0262969 | A1* | 11/2007 | Pak ............................... 345/173 |
| 2008/0157893 | A1 | 7/2008 | Krah |
| 2008/0158174 | A1 | 7/2008 | Land et al. |
| 2008/0158176 | A1 | 7/2008 | Land et al. |
| 2008/0158179 | A1 | 7/2008 | Wilson |
| 2008/0158182 | A1 | 7/2008 | Westerman |
| 2008/0158184 | A1 | 7/2008 | Land et al. |
| 2008/0238881 | A1 | 10/2008 | Perski et al. |
| 2008/0309622 | A1 | 12/2008 | Krah |
| 2009/0032312 | A1 | 2/2009 | Huang et al. |

* cited by examiner

*Primary Examiner* — Quan-Zhen Wang
*Assistant Examiner* — Tony Davis

(57) ABSTRACT

An electronic device is operable to determine a touch input applied to a capacitive touch panel system thereof so as to account for time-varying noise affecting the touch panel system. The electronic device includes the touch panel system, an analog-to-digital conversion (ADC) unit, and a processing unit. The processing unit is operable to: receive digital signal values from the ADC unit representing capacitances detected by sensing points of the touch panel system; adjust at least one of the digital signal values based at least on a time-varying noise to produce at least one noise-adjusted value; and determine the touch input based on the at least one noise-adjusted value. In one embodiment, the electronic device determines the time-varying noise prior to adjusting the digital signal values. In another embodiment, the time-varying noise is produced by a display panel of a touchscreen display that also includes the touch panel system.

41 Claims, 11 Drawing Sheets

ELECTRONIC DEVICE AND METHOD FOR DETERMINING A TOUCH INPUT APPLIED TO A CAPACITIVE TOUCH PANEL SYSTEM INCORPORATED THEREIN

FIELD OF THE INVENTION

The present invention relates generally to electronic devices and, more particularly, to determining a touch input applied to a capacitive touch panel system incorporated within an electronic device.

BACKGROUND

Projected capacitive touch panel systems are well known. Such systems are typically employed in touchscreens of electronic devices, such as smart phones, handheld gaming devices, global positioning system (GPS) devices, point-of-sale credit/debit card machines, and so forth. Typically, projected capacitive touch panel systems utilize a grid of sensing points to sense changes in self capacitance (e.g., between a sensor and ground) or mutual capacitance (e.g., between two sensors) as a result of a touch input caused by a user touching an area of the panel. The grid sensors typically coincide with pixel locations where the touch panel system forms part of a touchscreen display.

An exemplary touch panel system 100 is illustrated in FIG. 1. The touch panel system 100 includes a grid or matrix of sensing points 102 encased within a housing and covered by a protective dielectric lens. In the illustrated system 100, forty-eight (48) sensing points 102 are shown. The sensing points 102 are capacitive in nature and may be formed by overlapping conductors in a multilayer implementation or arranging conductors adjacent to one another in a single layer implementation. An excitation signal is applied to one or more excitation nodes 104 ($X_0$-$X_7$) and an output signal is detected at one or more output nodes 106 ($Y_0$-$Y_5$). The output signals are proportional to the sensing point capacitances.

For example, the charge of a capacitor with capacitance C at time t can be determined by the equation:

$Q=CVe^{-t/\tau}$, where $\tau=RC$;

R is the resistance associated with the capacitor (e.g., inherent and terminal resistances); and V is the voltage of the capacitor when fully charged.

Therefore, changes in the capacitance of a sensing point 102 can be detected by measuring the change in the discharge time of the sensing point 102. The discharge time is measured by measuring the output voltage decay as a function of time after application of an input signal burst. In a typical capacitive touch panel system 100, excitation signals are sequentially applied to each excitation node 104 and timers are used to measure the discharge times at the output nodes 106. For example, an excitation signal burst is applied to excitation node $X_0$ and timers are used to measure the discharge times at all the output nodes 106 ($Y_0$-$Y_5$) to determine the capacitances at the sensing points 102 defined by excitation node $X_0$ and the output nodes 106 ($Y_0$-$Y_5$). Excitation signals are then sequentially applied to the other excitation nodes 104 ($X_1$-$X_7$) and the discharge times at the output nodes 106 ($Y_0$-$Y_5$) are measured to determine the capacitances at the remaining sensing points 102. In other words, the sensing points 102 are effectively scanned repeatedly to detect variations in capacitance. Variation in the determined capacitances at one or more sensing points 102 may indicate a touch input in the area of the sensing points 102.

The application of a touch input signal to the touch panel system 100 may have different effects depending on the arrangement of the sensor grid. FIGS. 2 and 3 illustrate the effect of a touch input on electric fields and, therefore capacitance, depending on whether the sensing points 102 are configured to detect self-capacitance or mutual capacitance. For example, as illustrated in FIG. 2, the sensing points 102 may be arranged as a grid of sensors 203 that detect self-capacitance relative to ground 204. As noted above, the sensors 203 are typically protected by a flexible dielectric lens 201 that is touched by a user's finger 209 or an instrument, such as a stylus, pencil, toothpick, or other device. In operation, an excitation or drive signal 205 is supplied as a burst to the sensor 203 by an integrated circuit (IC) or other source. The drive signal is then removed and the amount of time required for the voltage of the sensor 203 to decrease to zero or some predetermined threshold is measured as the discharge time. As detailed above, the discharge time is directly related to the capacitance of the sensor 203.

In the case of a sensor 203 configured to detect self-capacitance, an electric field is created between the sensor 203 and ground 204 upon excitation of the sensor 203 by the excitation signal 205. The electric field includes a quantity of electric field lines 207 or flux between the charged node or plate of the capacitive sensor 203 and ground 204. When a touch input is applied by a user's finger 209, more electric field lines 211 are added from the sensor 203 to ground 204 due to the capacitive nature of the human body. Such additional electric field lines 211 result in an increase in the effective capacitance as detected by the sensor 203. The increase in capacitance causes a resulting increase in the discharge time of the sensor because, as noted above, the discharge rate of a capacitor varies as an inverse function of the capacitance (e.g., as capacitance increases, $\tau$ increases, the exponential discharge rate decreases, and the duration of time required to discharge the capacitor increases).

By contrast, a touch input has the effect of decreasing the effective capacitance where the sensing points 102 are configured to detect mutual capacitance. For example, as illustrated in FIG. 3, each sensing point 102 may be configured as two parallel sensors 301, 303 that sense the mutual capacitance between them. In this case, an IC excitation signal 305 applied to sensor 301 is received in attenuated form as a received signal 307 at sensor 303 based on the capacitance between the two sensors 301, 303. The difference in potential between the two sensors 301, 303 in the presence of the applied excitation signal 305 causes an electric field to be generated between the two sensors 301, 303. As illustrated in FIG. 3, the electric field includes electric field lines 309 or flux emanating from the charged sensor 301 and terminating at the receiving sensor 303. If a user touches the dielectric lens 201 near the sensors 301, 303, some of the electric field lines 311 are redirected to the user's finger 209 due to the inherent capacitance between the user and ground. The redirection of the electric field lines 311 causes an effective reduction in the capacitance between the two sensors 301, 303. As is known, the impedance between the two sensors 301, 303 is inversely proportional to the capacitance between the two sensors 301, 303. Therefore, as the capacitance decreases due to the presence of the touch input, the impedance of the capacitor increases and the level of the signal 307 received at the receiving sensor 303 decreases.

In an ideal environment, sensing points 102 of touch panel systems 100 would only detect signals and capacitance changes resulting from touch inputs. However, due to the presence of the housing and various electronic components of electronic devices that include touch panel systems 100, such systems 100 are required to distinguish touch inputs from various noise sources. For example, in a touchscreen display, a display panel is positioned in close proximity to the touch panel so that information can be displayed to the user as part of the touch panel user interface experience. An exemplary touchscreen display configuration is illustrated in FIG. 4. In the illustrated touchscreen display, a display panel 401 is positioned in close proximity below the touch panel system. In this case, the dielectric lens 201 would most likely be transparent so that the information displayed on the display panel 401 could be seen through the lens 201. The touchscreen display gives the user the impression that he or she is selecting areas on the display panel 401, when instead the user is actually selecting areas of the touch panel system that correspond to the displayed areas of the display panel 401. Software within a processing unit of the electronic device employing the touchscreen display maps the areas of the touch panel system to the information displayed on the display panel 401 to achieve the function or result desired by the user based on the user's touch input. Thus, accurately recognizing where the user touched the touch panel system is critical to proper operation of the touch panel system or a touchscreen display incorporating it.

Electronic components, such as display panels, generate spectral noise during operation. Such noise may be static (time-invariant) and/or may vary over time depending on the output of the electronic component. For example, the noise produced by a display panel, such as a liquid crystal display (LCD) panel, varies over time depending upon the colors and images displayed by the display panel, the refresh rate of the panel's pixels, the resolution of the display panel, and the display panel's backlight intensity. Placement of a noise-producing, electronic component in close proximity to capacitive sensors 203, 301, 303, such as those employed in a capacitive touch panel system, creates parasitic capacitance between the noise-producing component (e.g., a display panel) and the touch panel sensors 203, 301, 303, which in turn creates time-varying noise in the touch panel system. FIG. 5 provides a graphical illustration of the spectral noise detected by a capacitive touch panel system due to noise produced by a display panel positioned in close proximity and directly below the touch panel system. As can be seen from the graph 500, the amplitude of the noise 503 is only about three decibels (3 dB) below the amplitude of the touch input 501. Thus, the signal-to-noise ratio illustrated in FIG. 5 is only 3 dB. The signal-to-noise ratio would likely be even worse in touchscreen displays in which the touch panel system is integrated directly into the display panel. Much higher signal-to-noise ratios are desired to improve touch input resolution and facilitate higher sensing point scanning speeds.

As noted above, noise produced by a display panel typically comes in two forms—static (time-invariant) noise and time-varying noise. Prior art solutions have addressed filtering and other compensation for static noise components to assist in improving signal-to-noise ratios. However, prior art solutions have not adequately accounted for time-varying noise, which may be a significant noise source especially in touchscreen displays.

BRIEF DESCRIPTION OF THE DRAWINGS

The accompanying figures, where like reference numerals refer to identical or functionally similar elements throughout the separate views and which together with the detailed description below are incorporated in and form part of the disclosure, serve to further illustrate various embodiments and to explain various principles and advantages all in accordance with the present invention.

Figure 1:
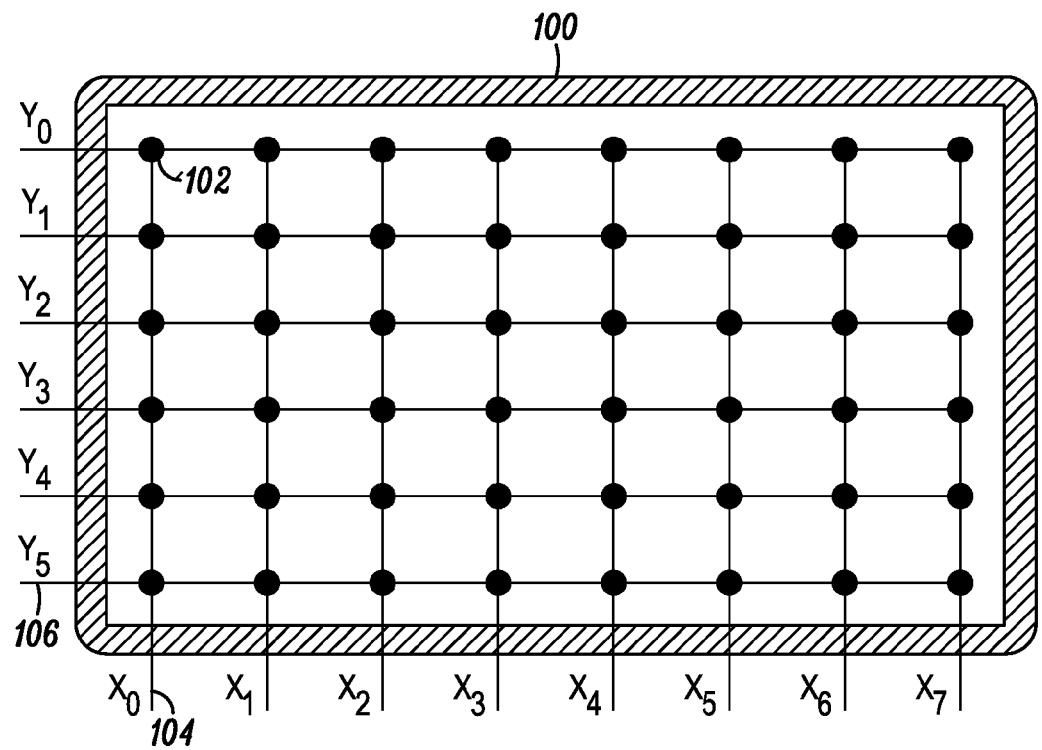
FIG. 1 illustrates an exemplary, prior art touch panel system showing a grid of sensing points.
Figure 2:
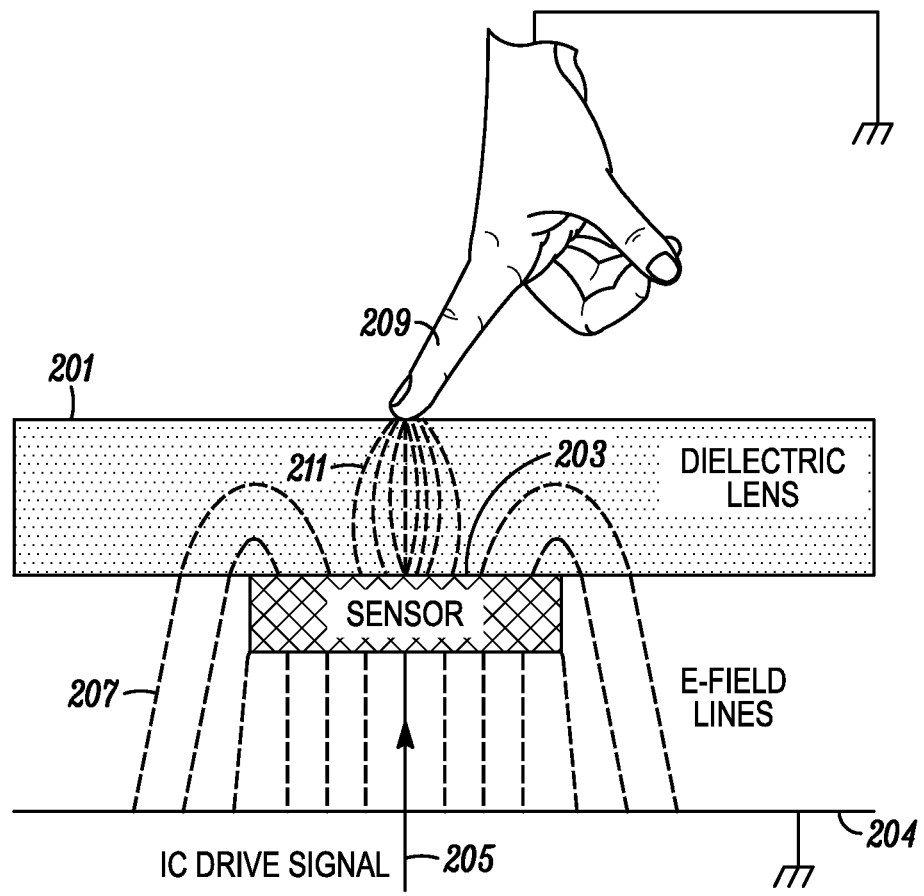
FIG. 2 illustrates an exemplary, prior art arrangement of a capacitive sensor for use as a sensing point in the capacitive touch panel system of FIG. 1 and configured to detect self-capacitance.
Figure 3:
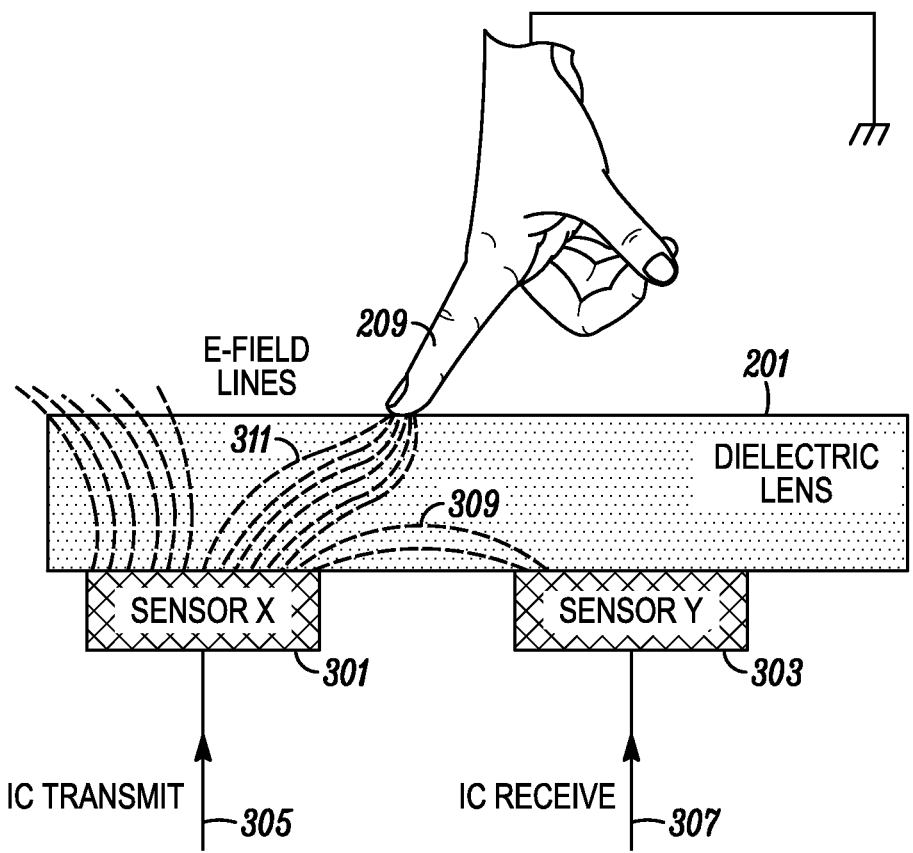
FIG. 3 illustrates an exemplary, prior art arrangement of capacitive sensors for use as a sensing point in the capacitive touch panel system of FIG. 1 and configured to detect mutual capacitance.
Figure 4:
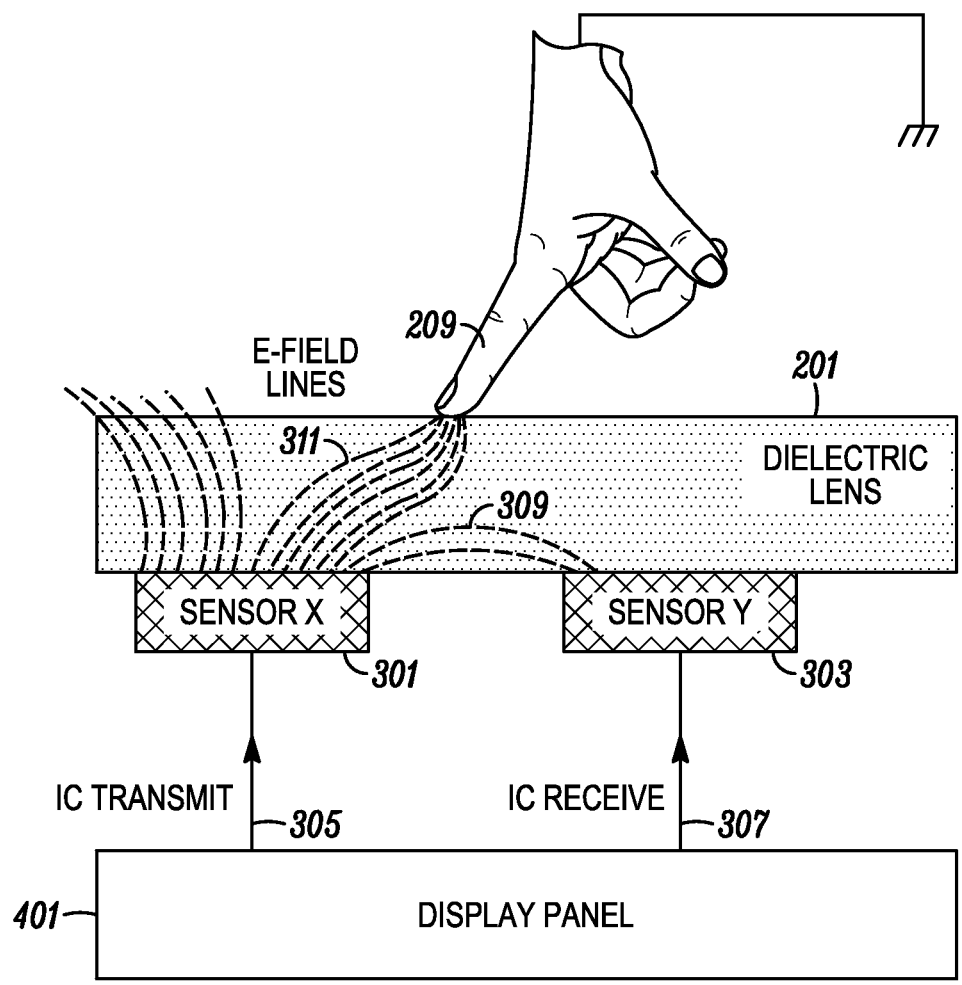
FIG. 4 illustrates an exemplary, prior art touchscreen display configuration containing a display panel positioned in close proximity to the arrangement of capacitive sensors depicted in FIG. 3.
Figure 5:
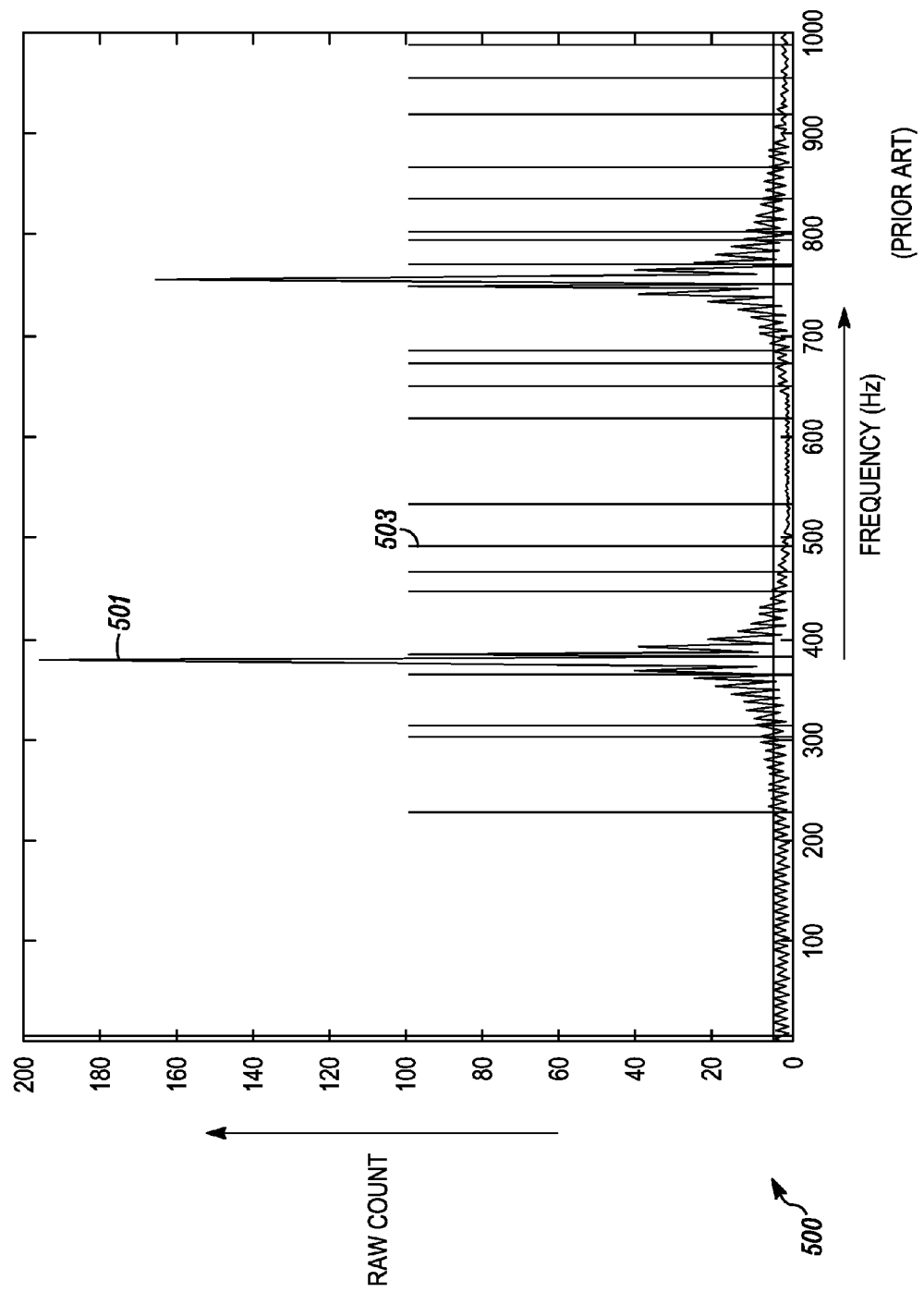
FIG. 5 is a graphical illustration of spectral noise detected by a capacitive touch panel system due to noise produced by a display panel positioned in close proximity to the touch panel system.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses an electronic device and a method for determining a touch input applied to a capacitive touch panel system incorporated within the electronic device. The electronic device may be a computer, a smart phone, a cellular phone, a handheld game system, a global positioning satellite (GPS) unit, a point-of-sale credit/debit card reader, or any other electronic device that includes, inter alia, a capacitive touch panel system, an analog-to-digital conversion (ADC) unit, and a processing unit. The touch panel system includes a plurality of sensing points that are operable to detect capacitances (e.g., self-capacitances or mutual capacitances) at the locations of the sensing points, which capacitances may have resulted from a touch input received from a user of the electronic device. The ADC unit is operably coupled to the sensing points and converts analog output signals from the sensing points to digital signal values that are usable by the processing unit.

The processing unit is operably coupled to the ADC unit and operable in accordance with a set of operating instructions. In one embodiment, the processing unit is operable to receive digital signal values or sensed values from the ADC unit representing capacitances detected by the sensing points. The processing unit then adjusts one or more of the sensed values based at least on a time-varying noise (and optionally based on static noise and gain) affecting the touch panel system and determines the touch input based on the noise-adjusted value(s). The time-varying noise may be a common mode noise that similarly affects all the sensing points. In one embodiment, the processing unit is also operable to determine the time-varying noise prior to adjusting the sensed values. Alternatively, the time-varying noise may be determined separately and supplied to the processing unit (e.g., via storage in memory). In another embodiment, the processing unit filters (e.g., digitally filters) the time-varying noise from the sensed values to produce the noise-adjusted values.

In another embodiment, one or more of the sensing points may be located in the touch panel system such that they are protected from, and insusceptible to, application of a touch input (e.g., they may be covered by a blacked-out section of a screen or shielded by a grounded cover, such as part of a housing supporting the touch panel system). In such a case, the processing unit may be operable to determine a time-varying noise affecting the touch panel system based on noise signals detected by the input-protected sensing points and processed through the ADC unit.

In an alternative embodiment, the processing unit may be operable in accordance with the set of operating instructions to determine a time-varying noise affecting the touch panel system by adjusting one or more of the sensed values to account for static, spatial-varying noise and static, spatial-varying gain to produce one or more adjusted values and then determining the time-varying noise value based on the adjusted value or values. For example, in one embodiment in which one or more input-protected sensing points are used to detect the time-varying noise, the processing unit may adjust only the sensed value or values from the input-protected sensing point or points. In an exemplary embodiment, the processing unit adjusts the sensed value from an input-protected sensing point by normalizing the sensed value to account for static, spatial-varying noise and static, spatial-varying gain. For example, such normalization may be performed by subtracting the static, spatial-varying noise from the sensed value to produce a difference and dividing the difference by the static, spatial-varying gain to produce the time-varying noise value.

Alternatively, when the sensing points that are not input-protected are used to detect the time-varying noise, the processing unit may adjust all of the sensed values resulting from the non-protected sensing points (which may include all of the sensing points of the touch panel system) to account for static, spatial-varying noise and static, spatial-varying gain. The processing unit may then determine an average of the adjusted values and compare each adjusted value to the average value to produce a plurality of comparison results. Based on the comparison results, the processing unit may determine a subset of the adjusted values and then determine an average of the subset of adjusted values to produce the time-varying noise value. For example, in one embodiment, the processing unit may adjust the sensed values by normalizing them to account for static, spatial-varying noise and static, spatial-varying gain. In such a case, the processing unit may then determine an average of the normalized values to produce the average value and compare each of the normalized values to the average value to produce the comparison results. Based on the comparison results, the processing unit may determine a subset of the normalized values and then determine an average of the subset of normalized values to produce the time-varying noise value, which may be considered a common mode noise value when the time-varying noise value is substantially constant over a surface area of the touch panel system.

In yet another embodiment, the processing unit may be further operable to adjust at least one of the sensed values based at least on the time-varying noise value by filtering the time-varying noise value from each of the sensed values to produce the noise-adjusted value(s). For example, the processing unit may, in the digital domain, subtract the time-varying noise value or a gain-adjusted version thereof (e.g., where the time-varying noise is affected by static, spatial-varying gain) from each of the sensed values.

In a further embodiment, the electronic device may also include at least one electronic noise source (e.g., a display panel) that is located proximate the touch panel system and is controllable by the processing unit. In such a case, the time-varying noise affecting the touch panel system results at least in part from operation of the electronic noise source. In this embodiment, the processing unit may be further operable, in accordance with the set of operating instructions, to determine whether a touch input is present based on the comparison results (i.e., the results of the comparisons of the adjusted (e.g., normalized) sensed values to the average of the adjusted sensed values). For example, a touch input may be determined to be present when the comparison results indicate that at least one of the adjusted sensed values is greater than the average of the adjusted sensed values by a predetermined threshold when the vast majority of the adjusted sensed values are less than or equal to the average value (e.g., where the sensing points of the touch panel system detect self-capacitance) or at least one of the adjusted sensed values is less than the average of the adjusted sensed values by a different predetermined threshold when the vast majority of the adjusted sensed values are greater than or equal to the average value (e.g., where the sensing points of the touch panel system detect mutual capacitance). Responsive to a determination that a touch input is present, the processing unit may be further operable to slow operation of the electronic noise source(s) on a temporary basis so as to cause noise produced thereby to be substantially less time dependent. Additionally, while operation of the electronic noise source is slowed, the processing unit may rescan the sensing points to detect capacitance values, adjust (e.g., normalize) the sensed values, determine an average of the adjusted sensed values, and compare each of the adjusted values to the average value. In other words, the processing unit may, upon detecting that a touch input is present, attempt to cause the time-varying noise to become substantially time-invariant or at least slow-changing in order to increase the accuracy of the noise measurement and thereby increase the likelihood of filtering the noise out of the touch panel system in order to more accurately determine the location of the touch input.

For example, the electronic noise source may include a display panel that together with the touch panel system form a touchscreen display. In this case, operation of the display panel causes time-varying noise in the touch panel system. Therefore, when the processing unit detects that a touch input is present based on the comparison results, the processing unit may slow operation of the electronic noise source by temporarily freezing operation of at least part of the display panel. For example, the processing unit may freeze or stop changes in the entire display panel or in a part of the display panel, such as in an area surrounding an estimated location of the touch input. The estimated location of the touch input may be determined as at least the area encompassing all sensing points having detected capacitances that resulted in adjusted (e.g., normalized) values which are greater than or less than (as applicable depending on the type of capacitance being detected by the sensing points) the average of all the adjusted values.

In yet another embodiment, the sensing points may include a plurality of excitation nodes and a plurality of output nodes configured in a grid arrangement. In such a case, the capacitance at each sensing point may be detected by applying excitation signals to the excitation nodes, scanning the output nodes to detect corresponding output signals responsive to the excitation signals, and determining the capacitance at each sensing point based on a corresponding output signal. In this embodiment, the excitation signals may be identical and applied to each excitation node in a predetermined order one at a time and the output nodes may be scanned in a predetermined order one at time, in a random order one at a time, in groups substantially simultaneously, or all substantially simultaneously (e.g., at a common clock pulse or cycle, but due to inherent delays all output signals may not be detected at exactly the same time).

In yet a further embodiment, the capacitance detected at a particular time and at a particular sensing point may be defined by the following equation:

$$R(n,t) = G(n)*S(n \cdot t) + G(n)*D(t) + B(n),$$

where n is a location of the particular sensing point in the touch panel system; t is the particular time; R(n,t) is a sensed value corresponding to the capacitance detected at the particular sensing point at the particular time; G(n) is static, spatial-varying gain at the location of the particular sensing point; S(n,t) represents a touch input signal at the location of the particular sensing point at the particular time; D(t) is a time-varying, common mode noise value at the particular time; and B(n) is static, spatial-varying noise at the location of the particular sensing point. In accordance with such an embodiment, sensed values detected at the sensing points (e.g., as may be determined by the outputs of the ADC unit) may be normalized to account for static, spatial-varying noise and static, spatial-varying gain by subtracting corresponding static, spatial-varying noise from each of the sensed values to produce a set of differences (e.g., each of which may be represented by R(n,t)−B(n) for the particular time and the particular sensing point) and dividing each of the differences by a corresponding static, spatial varying gain to produce the normalized values, wherein each of the normalized values is represented by R'(n,t)=[R(n,t)−B(n)]/G(n) for the particular time and the particular sensing point. As a result, the average of the normalized values may be determined by the following equation:

$$AvgR'(n,t) = \Sigma R'(n,t)/N = \Sigma S(n,t)/N + \Sigma D(t)/N,$$

where AvgR'(n,t) is the average value, and N is a total quantity of the sensing points. In this case, R'(n,t) is determined and summed for all of the sensing points. Finally, for this embodiment, the average of the subset of normalized values may be determined according to the following equation:

$$D(t) = \Sigma R''(n,t)/N',$$

where D(t) is the time-varying noise value, and N' is a quantity of the subset of normalized values and is less than or equal to N. R''(n,t) equals [R(n,t)−B(n)]/G(n) and is determined only for those sensing points for which a touch input is absent based on the comparison results.

By providing an electronic device with the aforementioned functionality, the present invention facilitates accurate determination of a touch input to a touch panel system in the presence of time-varying noise. Such noise is present in many touch panel systems, especially those used to form touchscreen displays. The positioning of a time-varying display panel in close proximity to a touch panel system, as is done in a touchscreen display, results in the injection of time-varying noise from the display panel into the touch panel system due to parasitic capacitance between the display panel and the touch panel sensing points. The amount of such display-induced noise is expected to increase as touchscreen display vendors begin incorporating touch sensor layers into display layers. The present invention provides a mechanism for determining the time-varying noise produced by the display panel and other electronic noise sources in real time to thereby enable accurate filtering of such noise during resolution of a touch input to the touch panel system.

Figure 6:
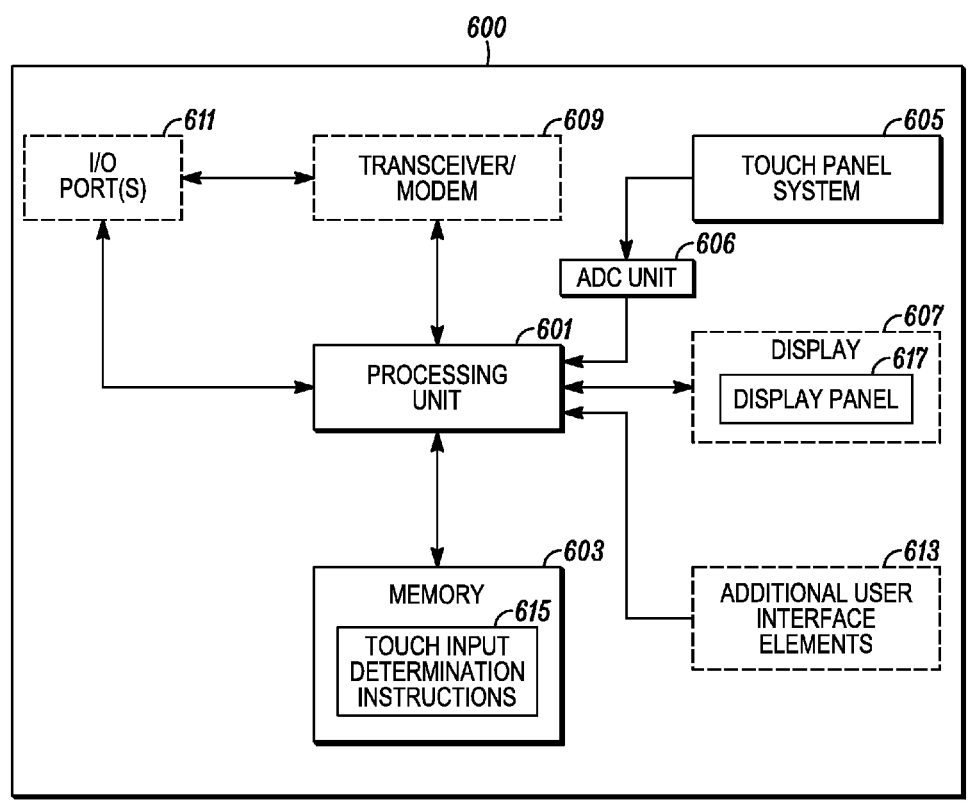
FIG. 6 is an electrical block diagram of an electronic device incorporating a touch panel system, in accordance with another exemplary embodiment of the present invention.

Embodiments of the present invention can be more readily understood with reference to FIGS. 6-12, in which like reference numerals designate like items. FIG. 6 is an electrical block diagram of an electronic device 600 in accordance with an exemplary embodiment of the present invention. The exemplary electronic device 600 includes, inter alia, a processing unit 601, at least one storage device (e.g., memory 603), a touch panel system 605, and an analog-to-digital conversion (ADC) unit 606. The touch panel system 605 preferably operates as the user interface for the electronic device 600 or as part of the user interface. As illustrated, the processing unit 601 is operably coupled to the memory 603 and the ADC unit 606. The electronic device 600 may optionally include various other elements, including but not limited to a display 607, one or more transceivers/modems 609 (one shown) to provide wired and/or wireless communication functionality, one or more input/output ports 611 (which may be wired or wireless interfaces), and additional user interface elements 613 (e.g., keypads, buttons, rocker keys, scroll wheels, joy sticks, and so forth). When included, all such components 607-613 are operably coupled to and controlled directly or indirectly by the processing unit 601. The electronic device 600 may also support interconnection to an external, transportable memory device (not shown), such as Universal Serial Bus (USB) flash drive, a flash memory card, a digital versatile disk (DVD), a compact disc, read-only memory (CD-ROM), a hard drive, a subscriber identification module (SIM) card, or any other portable storage device. The external memory, when used, may store photographs, data, applications, or other information usable by the processing unit 601 during operation of the electronic device 600 and/or in support of the present invention.

Figure 7:
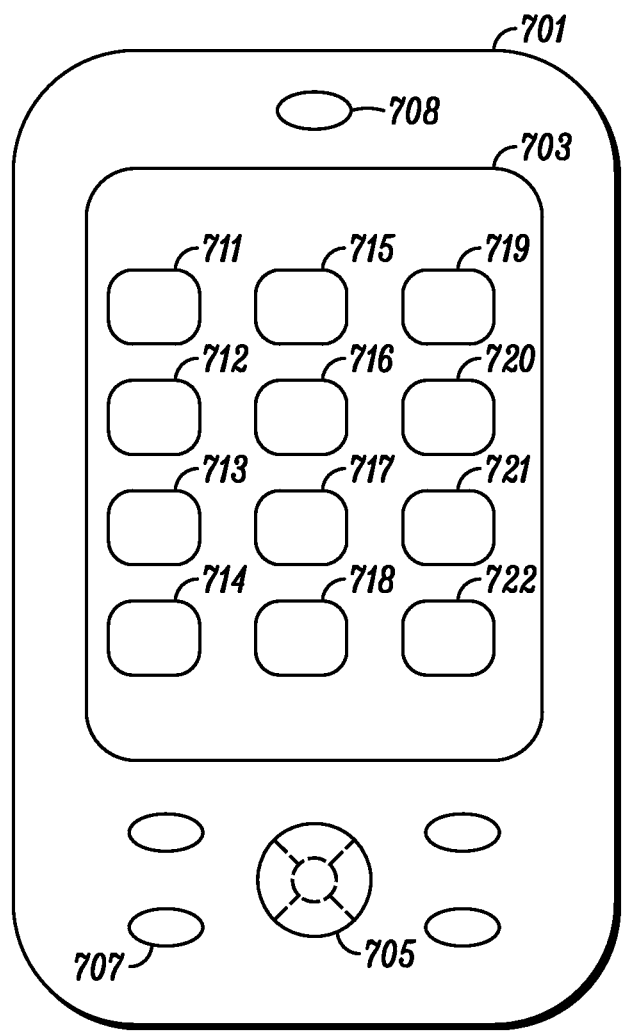
FIG. 7 illustrates a smart phone embodiment of the electronic device of FIG. 6, which includes a touchscreen display in accordance with another exemplary embodiment of the present invention.

The electronic device 600 may be any device that utilizes a touch panel system 605 for any purpose, including as the device's user interface or a part thereof. Accordingly, the electronic device 600 may be a smart phone, a cellular phone, a netbook computer, a notebook or laptop computer, a handheld or portable gaming device, a palmtop computer, a portable DVD player, a GPS or other navigation unit, a digital camera, a point-of-sale debit/credit card transaction device, a portable digital audio player, or any other device supporting a touch panel system. An exemplary handheld smart phone embodiment of the electronic device 600 is illustrated in FIG. 7 and will be discussed in more detail below.

The processing unit 601 may be a microprocessor, a microcontroller, a digital signal processor (DSP), a state machine, logic circuitry, or any other device or combination of devices that processes information based on operational or programming instructions stored in the memory 603. One of ordinary skill in the art will appreciate that the processing unit 601 can be implemented using multiple processors as may be required to handle the processing requirements of the present invention and the various other included functions of the electronic device 600. One of ordinary skill in the art will further recognize that when the processing unit 601 has one or more of its functions performed by a state machine or logic circuitry, the memory containing the corresponding operational instructions can be embedded within the state machine or logic circuitry as opposed to being external to the processing unit 601, as is the internal memory 603 illustrated in FIG. 6. In one embodiment, the processing unit 601 controls substantially all the functionality of the electronic device 600.

The electronic device's internal memory 603 stores, inter alia, a set of touch input determination instructions 615 executed by the processing unit 601 during operation of the electronic device 600. The touch input determination instructions 615 include commands for instructing the processing unit 601 with respect to determining the presence and location of a touch input in accordance with various embodiments of the present invention. Thus, the touch input determination instructions 615 may be embodied in a computer program that is stored in the memory 603 and executable by the processing unit 601. The computer program may be implemented in software, firmware, or an application specific integrate circuit (ASIC). For example, the touch input determination instructions 615 may implement logic flows as contained in the exemplary logic flow diagrams 800, 900 illustrated in FIGS. 8 and 9, which are discussed in more detail below. The memory 603, which may be separate from the processing unit 601 as depicted in FIG. 6 or integrated into the processing unit 601 as noted above, can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate device memory and that the device memory may include one or more individual memory elements.

The touch panel system 605 may be any conventional capacitive touch panel system that includes a grid, matrix or other arrangement of sensing points. For example, the touch panel system 605 may be implemented in a manner similar to the touch panel systems discussed above with respect to FIGS. 1-4. With such an embodiment, the sensing points may include a set of excitation nodes and a set of output nodes configured in a grid arrangement. The quantity of excitation nodes may be equivalent to or different than the quantity of output nodes. Where the electronic device 600 includes a touchscreen display formed by the touch panel system 605 and the display 607, the sensing points of the touch panel system 605 may coincide with the pixels of a display panel 617 of the display 607. In one embodiment, the touch panel sensing points produce analog output signals at the output nodes, which are supplied to the ADC unit 606 for conversion into digital signals that are usable by the processing unit 601. The ADC unit 606 may include one or more analog-to-digital converters as necessary to process the analog signals from the sensing points of the touch panel system 605.

When included, the display 607 may be any conventional or future-developed display, such as a liquid crystal display (LCD), a plasma display, a light emitting diode (LED) display, an organic LED (OLED) display, or any other display technology, which includes a display panel 617 on which images are electronically displayable. The display 607 includes appropriate conventional drivers and may optionally include graphics processors for illuminating various portions (e.g., pixels) of the display panel 617 as instructed by the processing unit 601. In one embodiment, the display panel 617 and the touch panel system 605 may be integrated to form a touchscreen display that serves as the electronic device's user interface or a part thereof, as is known in the art. Additionally, the display 607 and the display panel 617 function as a type of electronic noise source with respect to the touch panel system 605 and inject time-varying noise into the touch panel system 605 due the display panel's close proximity to the touch panel system 605, especially when the touch panel system 605 and the display 607 form a touchscreen display of the electronic device 600. The close proximity of the display panel 617 to the touch panel system 605 produces parasitic capacitance between them, which capacitance provides a frequency-dependent conduit between the display panel 617 and the touch panel system 605. The amount of parasitic capacitance between the display panel 617 and the touch panel system 605 varies over time based on the activity of the display 607 and the images displayed on the display panel 617. As a result, the noise level and spectrum produced by the display panel 617 and coupled to the touch panel system 605 is time-varying.

There may be other sources of time-varying electronic noise in the electronic device 600, such as clock oscillators, frequency synthesizers, integrated cameras, various sensors, transceivers, memory buses, digital circuitry, and battery charging circuits. These electronic noise sources may function as other sources of time-varying noise that can affect the signal-to-noise ratio of the touch panel system 605 and cause errors in detecting touch inputs to the touch panel system 605. For example, a battery charging circuit can be a significant source of time-varying, common mode noise to a touch panel system in an electronic device, such as a cellular phone, sometimes rendering the touch panel system inaccurate when the electronic device is charging. The impact a particular electronic noise source has on the time-varying noise depends on several factors, such as its frequency (e.g., how close the noise source's operating frequency is to the operating frequency of the capacitive sensing points), configuration in the electronic device (e.g., whether or not there is appropriate shielding between the noise source and the sensing points), and distance from the sensing points.

The transceiver/modem 609, when included, may comprise any conventional hardware and software for communicating information between the electronic device 600 and one or more other devices. Thus, the transceiver/modem 609 may support one or more wired or wireless communication protocols, such as Ethernet, Wi-Fi (e.g., IEEE 802.11a/b/g/n), WiMax (e.g., IEEE 802.16), Ultra Wide-Band (e.g., IEEE 802.15.4a draft standard), Bluetooth, Zigbee, USB, code division multiple access (CDMA), wideband CDMA, time division multiple access (TDMA), Global System for Mobile Communications (GSM), Enhanced Data GSM Environment (EDGE), General Packet Radio Service (GPRS), frequency division multiple access (FDMA), orthogonal frequency division multiplexing (OFDM), Long Term Evolution (LTE) developed by the Third Generation Partnership (3GPP), spread spectrum, or any other known or future developed access or link protocol or methodology. The transceiver/modem 609 may include multiple transceivers/modems when multiple link technologies are employed by the electronic device 600.

The I/O port 611 or ports interface the transceiver/modem 609 and/or the processing unit 601 with the outside world and may include Ethernet connectors, antennas, USB connectors, and various other connectors and physical interfaces. Where the electronic device 600 is connectable to an external memory device, one or more of the I/O ports 611 may function as an external memory interconnect to connect to the external memory device.

When included, the additional user interface elements 613 may be any conventional user interface components or combination of conventional user interface components, such as rocker keys, buttons, a keypad, a keyboard, a scroll wheel, a thumbwheel, one or more microphones and associated speech conversion/processing software, one or more speakers, or any other now known or future-developed user interface technology. In one embodiment, the additional user interface elements 613 work in tandem with the user interface features provided by the touch panel system 605 in accordance with known techniques.

FIG. 7 illustrates a smart phone embodiment of the electronic device 600 of FIG. 6 in accordance with an exemplary embodiment of the present invention. The illustrated smart phone 701 includes a touchscreen display 703 as well as additional, optional user interface elements 613 implemented as a two-dimensional rocker key 705 and a set of buttons 707. The exemplary smart phone 701 also includes an optional camera 708. In accordance with one embodiment of the present invention, the display panel 617 of the touchscreen display 701 displays a set of icons 711-722 to a user of the smart phone 701. The icons 711-722 may represent applications executable by the smart phone's processing unit 601 or other user-selectable objects. The user may select an icon (e.g., icon 711) by touching the external surface of the display panel 617, which may be glass or another resilient dielectric cover, just above the desired icon 711. The touch input is then detected by the touch panel system 605 in accordance with the present invention and the selected icon 711 is determined based on a comparison of the location of the touch input with a mapping of the position of the icon 711 on the display panel 617. Once the selected icon 711 has been identified, the processing unit 601 of the smart phone 701 performs appropriate processing (e.g., executes the selected application) based on instructions stored in memory 603 and associated with the selected icon 711.

Figure 8:
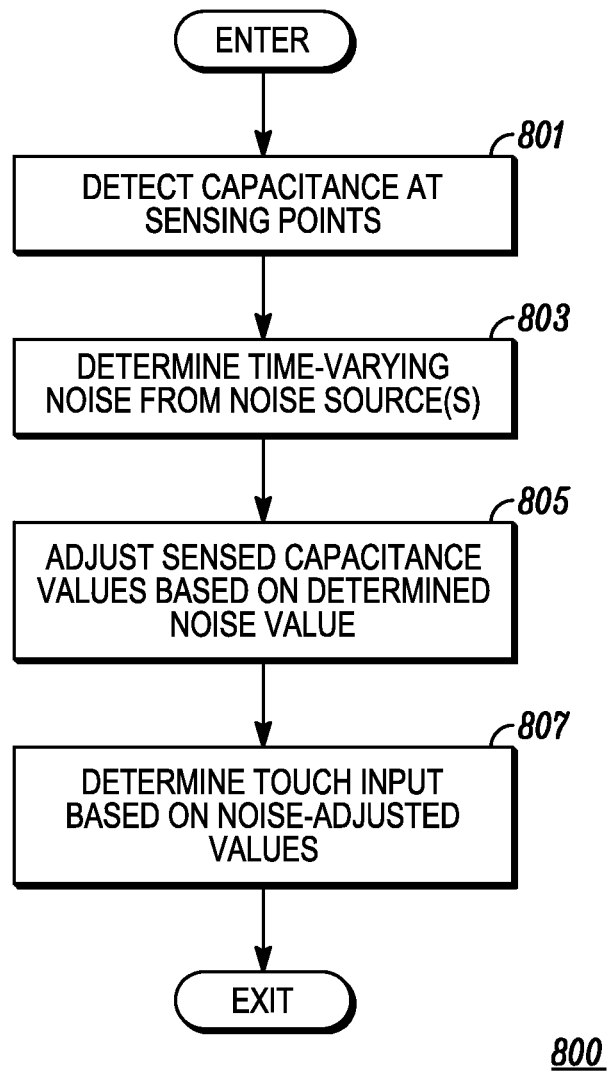
FIG. 8 illustrates a logic flow diagram of steps executable by an electronic device to determine a touch input applied to a capacitive touch panel system of the electronic device, in accordance with one embodiment of the present invention.

Operation of the electronic device 600 to determine a touch input to the touch panel system 605 in accordance with one exemplary embodiment may be more readily understood with reference to FIGS. 6-8. FIG. 8 illustrates a logic flow diagram 800 of steps executable by the electronic device 600 to determine a touch input applied to the touch panel system 605. Pursuant to the logic flow of FIG. 8, the processing unit 601 detects (801) capacitance at sensing points of the touch panel system 605. Such capacitance detection may be performed by temporarily applying excitation signals to excitation nodes of the sensing points, scanning output nodes of the sensing points (which may be the same nodes as the excitation nodes where the sensing points detect self-capacitance) to detect output signals, and determining the capacitances based on the output signals. For example, output signals may be voltages between the sensing points and ground (e.g., where the sensing points detect self-capacitance) or voltage differences between the sensing points (e.g., where the sensing points detect mutual capacitance). The excitation nodes may be excited, and the output nodes scanned, substantially simultaneously, individually, or in groups. When sensing points are excited and scanned individually or in groups, such excitation or scanning may be performed in a predetermined order or in a random order. In one preferred embodiment, a substantially identical excitation signal is applied to each excitation node in a predetermined order one at a time or one group at a time. For example where the sensing points of the touch panel system 605 are arranged in a grid format such as the format illustrated in FIG. 1, an excitation signal may be applied to a column of sensing points that share a common excitation node (e.g., $X_n$). Thus, excitation of a single excitation node may result in an excitation signal being applied to multiple sensing points. The output signals detected at the output nodes of the sensing points (which nodes may also be shared by multiple sensing points on a per row basis as illustrated in FIG. 1) are preferably detected simultaneously for a given excitation signal such that the output nodes of the sensing points are essentially scanned contemporaneous with or immediately after application of the excitation signal.

The capacitances detected by the sensing points may be the result of static noise, static gain, time-varying noise, and/or an input touch. In one embodiment, the determined capacitance at time t and position n on the touch panel system 605 may be represented by the equation:

$$R(n,t)=G(n)*S(n \cdot t)+G(n)*D(t)+B(n), \quad \text{(Equation 1)}$$

where n is the location of the particular sensing point in the touch panel system;

t is the particular time;

R(n,t) is a sensed value corresponding to the capacitance detected at the particular sensing point at the particular time;

G(n) is static, spatial-varying gain at the location of the particular sensing point;

S(n,t) represents a touch input signal at the location of the particular sensing point at the particular time;

D(t) is a time-varying, common mode noise value at the particular time; and

B(n) is static, spatial-varying noise at the location of the particular sensing point.

In addition to detecting the capacitance at the touch panel system's sensing points, the processing unit 601 determines (803) the time-varying noise from one or more electronic noise sources of the electronic device 600. In one embodiment in which the electronic device 600 includes a touchscreen display 703 formed by the touch panel system 605 and the display 607, the primary source of time-varying noise is the display panel 617 of the display 607 due to its close proximity to the touch panel system 605. The time-varying noise may be determined by detecting such noise through one or more sensing points that are protected from application of a touch input. By isolating the sensing point or points used to determine the time-varying noise, the signal detected by the input-protected sensing point contains only static, spatial-varying noise, static, spatial-varying gain, and the subject time-varying noise. Thus, the time-varying noise may be readily determined by adjusting the capacitance value or values sensed by the input-protected sensing point or points to account for the static, spatial-varying noise and the static, spatial-varying gain. For example, the capacitance value sensed by the input-protected sensing point may be filtered to remove the static noise and the filtered signal may be normalized to account for the static gain. Referring to Equation 1, when an input-protected sensing point is used, the adjusted capacitance value at the input-protected sensing point ($R'(n_{IP}, t)$) may be computed as:

$$R'(n_{IP},t)=[R(n_{IP},t)-B(n_{IP})]/G(n_{IP}),  \quad \text{(Equation 2)}$$

where $n_{IP}$ refers to the location of the input-protected sensing point. In this case, because there is no touch input ($S(n,t)$) at the input-protected sensing point, the adjusted value ($R'(n_{IP}, t)$) is equivalent to the time-varying noise ($D(t)$) at the input-protected sensing point and at all the other sensing points due to the common mode nature of such noise.

Alternatively, the time-varying noise affecting the touch panel system 605 may be determined without isolating any of the sensing points. To make such a determination in accordance with one embodiment of the present invention, the processing unit 601 adjusts all the sensed values to account for corresponding static, spatial-varying noise and static, spatial-varying gain. For example, the processing unit 601 may normalize the sensed values to account for the static noise and gain. In this case, referring again to Equation 1 and similar to Equation 2, the adjusted/normalized capacitance values for the sensing points may be determined from the following equation:

$$R'(n,t)=[R(n,t)-B(n)]/G(n).  \quad \text{(Equation 3)}$$

However, in this case, $R'(n,t)$ is not necessarily equal to the time-varying noise ($D(t)$) because a touch input may be present. Therefore, the normalized capacitance value may also be represented as follows:

$$R'(n,t)=S(n,t)+D(t).  \quad \text{(Equation 4)}$$

To isolate the time-varying noise ($D(t)$) in Equation 4, the touch input must be removed from the equation. To do so requires determining for each sensing point whether the sensing point is being affected by a touch input. In one embodiment, the processing unit 601 makes such a determination by determining an average of the adjusted values and comparing each adjusted value ($R'(n,t)$) to the average value. The results of the comparison provide an indication as to whether a touch input is present. For example, where the sensing points are designed to detect self-capacitance, an adjusted value greater than the average value by a predetermined threshold (e.g., at least ten percent greater than the average) may indicate the presence of a touch input at or near the sensing point. On the other hand, where the sensing points are designed to detect mutual capacitance, an adjusted value less than the average value by a predetermined threshold (e.g., at least ten percent less than the average) may indicate the presence of a touch input at or near the sensing point.

After the processing unit 601 compares all the adjusted values for the sensing points to the average value, the processing unit 601 may eliminate those sensing points (and their associated adjusted values) at which a touch input has been detected and determine a subset of the adjusted values based on the adjusted values for only those sensing points for which a touch input was not detected. In other words, the subset of adjusted values that may be assumed to be unaffected by a touch input is determined based on the comparison results. After the subset has been determined, the processing unit 601 may determine an average of the subset of adjusted values to produce the time-varying noise value ($D(t)$). Therefore, regardless of whether the time-varying noise is determined through use of one or more input-protected sensing points or through evaluating all the sensing points, the time-varying noise value may be determined based on one or more of the adjusted values (e.g., the adjusted value(s) corresponding to the input-protected sensing point(s) when one or more such sensing points are used or the adjusted values corresponding to all the sensing points when one or more input-protected sensing points are not used).

To more accurately determine the time-varying noise present in the touch panel system 605, the processing unit 601 may slow or even freeze operation of the electronic noise source upon determining that a touch input is present at one or more of the sensing points. That is, the processing unit 601 may slow or freeze operation of the electronic noise source upon determining that each of a predetermined quantity of adjusted values differs from the average value by the applicable threshold so as to indicate that a touch input is present at or near the corresponding sensing points. Where the electronic noise source is a display 607, the processing unit 601 may slow or freeze operation of the display panel 617 or a part thereof (e.g., in an area around the sensing points corresponding to the adjusted values that indicated the presence of the touch input). The slowing of operation of the electronic noise source or sources under the control of the processing unit 601 causes the noise produced thereby to be substantially less time dependent and more readily detectable. Accordingly, where the operation of the electronic noise source is slowed, the processing unit 601 may rescan the sensing points and re-process the sensed values while the time-varying noise is much less time dependent prior to determining the subset of adjusted values that are to be used for determining the time-varying noise value. Slowing operation of the electronic noise source when a touch input is detected allows for improved accuracy of the time-varying noise value in the presence of a touch input. Additional detail related to the slowing or freezing of operation of the display panel 617 or a part thereof by the processing unit 601 responsive to a determination that a touch input is present is provided below with respect to FIG. 11.

Once the time-varying noise has been determined, such noise is presumed to affect each sensing point in a common manner. Prior analysis of touchscreen displays has shown that time-varying noise from display panels typically has common characteristics for all the sensing points of a touch panel system. Thus, once the time-varying noise has been determined, the processing unit 601 may adjust (805) the capacitance values sensed by the sensing points based on the determined time-varying noise value and determine (807) the touch input based on the noise-adjusted values. For example, the processing unit 601 may filter the determined time-varying noise value from each of the sensing points (e.g., where all of the sensing points are not input-protected) or from only those sensing points that are not input-protected (e.g., where one or more input-protected sensing points were used to determine the time-varying noise value). In the digital domain, the time-varying noise may be subtracted from the sensed capacitance value to achieve the filtering. However, because the time-varying noise is affected by the spatial-varying gain at a particular sensing point, the gain-adjusted, time-varying noise may need to be filtered. For instance, referring back to Equation 1, filtering of the determined time-varying noise may be achieved by subtracting the quantity $G(n)*D(t)$ from $R(n,t)$ or from the quantity $R(n,t)-B(n)$, which is the sensed capacitance value adjusted to take into account the static, spatial-varying noise ($B(n)$). The static, spatial-varying noise ($B(n)$) and the static, spatial-varying gain ($G(n)$) may be determined for all the sensing points while the display panel 607 or other electronic noise source is turned off (e.g., during manufacture of the electronic device 600) as discussed in more detail below with respect to FIG. 10.

After the sensed capacitance value has been adjusted based on the time-varying noise value (and optionally based on the static noise value), the processing unit 601 may determine (807) the touch input or touch input value based on the noise-adjusted values. For example, referring back to Equation 1, the touch input (S(n,t)) can then be determined from the equation:

$$S(n,t)=[R(n,t)-G(n)*D(t)-B(n)]/G(n). \quad \text{(Equation 5)}$$

Thus, at those sensing points where a touch input is present, the touch input value may be given by Equation 5. At those sensing points where a touch input is not present, the touch input value derived from Equation 5 will be substantially zero or a very small value relative to the values at which a touch input is present.

Figure 9:
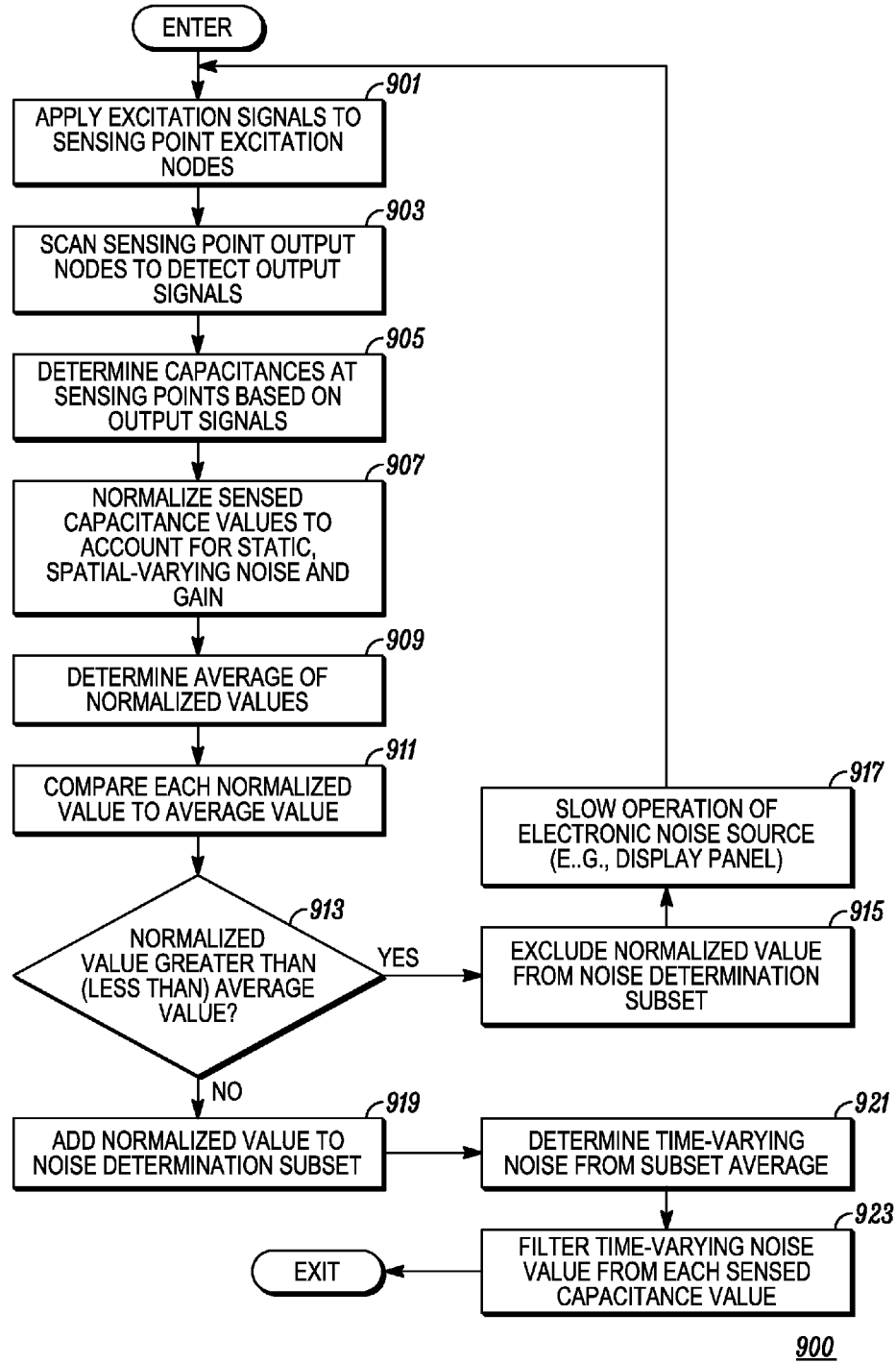
FIG. 9 illustrates a logic flow diagram of steps executable by an electronic device to determine a touch input applied to a capacitive touch panel system of the electronic device, in accordance with an alternative embodiment of the present invention.
Figure 10:
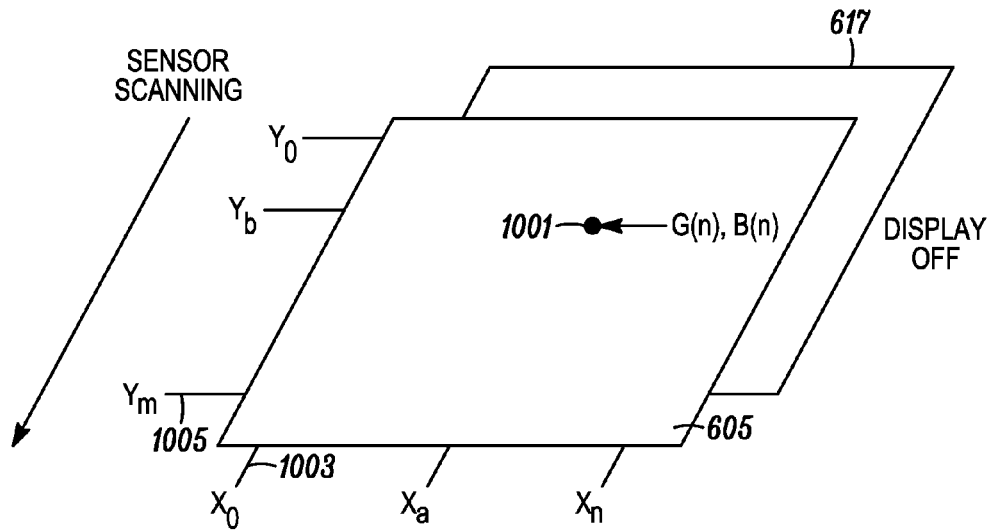
FIG. 10 is an exemplary touchscreen display illustrating determination of static, spatial-varying noise and static, spatial-varying gain when a display panel of the touchscreen display is off, in accordance with one embodiment of the present invention.
Figure 11:
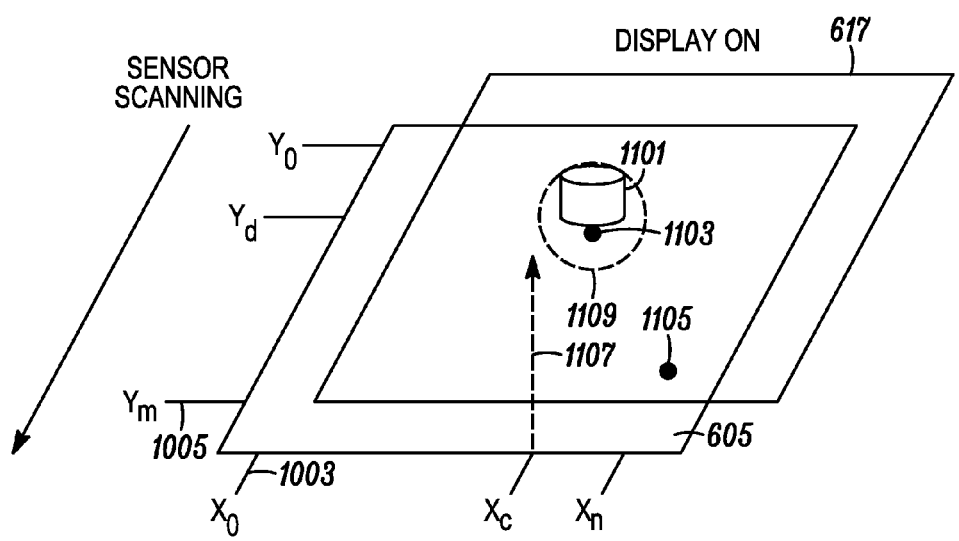
FIG. 11 illustrates determination of a touch input on the touchscreen display of FIG. 10 when a display panel of the touchscreen display is on, in accordance with various embodiments of the present invention.

Operation of the electronic device 600 to determine a touch input in accordance with an alternative exemplary embodiment of the present invention may be more readily understood with reference to FIGS. 6-7 and 9-12. FIG. 9 illustrates an alternative logic flow diagram 900 of steps executable by the electronic device 600 to determine a touch input (e.g., input 1101 of FIG. 11) applied to a capacitive touch panel system 605 of the electronic device 600. In accordance with this embodiment, the processing unit 601 applies (901) excitation signals to excitation nodes of the touch panel system's sensing points. For example, referring to FIG. 11, while the display 607 or other electronic noise source is on, the processing unit 601 applies an excitation signal to each excitation node 1003 of the touch panel system 605. As illustrated in FIGS. 1 and 11, the touch panel system may include a grid or array of capacitive sensing points. The sensing points may include vertically-aligned excitation nodes 1003 and horizontally-aligned output nodes 1005, with each sensing point being located at a position n=X, Y within the touch panel system 605. With such an arrangement, each vertical column of sensing points may share a common excitation node ($X_0$-$X_n$) and each horizontal row of sensing points may share a common output node ($Y_0$-$Y_m$). The number of rows of sensing points may be different than or the same as the number of columns of sensing points depending upon the configuration of the touch panel system 605. Alternatively, the sensing points may be arranged in a configuration other than a rectangular grid.

When the sensing points are arranged in a rectangular grid and the sensing points in each column share a common excitation node 1003 while the sensing points in each row share a common output node 1005, the processing unit 601 may apply (901) an excitation signal to one excitation node 1003 at a time and then scan (903) each output node 1005 to detect the output signals produced as a result of the excitation signal. In one embodiment, each applied excitation signal is (though need not be) substantially identical. In this manner, the processing unit 601 essentially scans the sensing points to determine their sensed capacitances. The output nodes 1005 may be scanned in a predetermined order (e.g., from $Y_0$ to $Y_m$ in the direction shown in FIGS. 10-12), in a random order, or substantially simultaneously (where the ADC unit 606 and the processing capabilities of the processing unit 601 are adequate to handle simultaneous processing of the output signals). The analog output signals from the sensing points are converted to digital signal values by the ADC unit 606. The digital signal values are provided to the processing unit 601 and represent the capacitance values detected or sensed by the sensing points at a respective particular time t. Thus, upon receiving the digital values from the ADC unit 606, the processing unit 601 determines (905) the capacitances detected by the sensing points based on the output signals from the sensing point output nodes. For example, each sensed capacitance value is the analog output of a particular output node converted to a digital value by the ADC unit 606. The sensed capacitance value output from the ADC unit 606 may be represented by Equation 1 above for a sensing point located at location n.

After the capacitance values have been determined for the sensing points, the processing unit 601 proceeds to determine the time-varying noise affecting the touch panel system 605. In one embodiment, the time-varying noise may be determined through use of one or more dummy or input-protected sensing points (e.g., sensing point 1105 in FIG. 11). As discussed above, the input-protected sensing point 1105 is protected from application of a touch input, but otherwise functions similar to the non-protected sensing points (e.g., sensing point 1103 of FIG. 11). The sensed value (R(n,t)) for the input-protected sensing point 1105 may be given by Equation 1 with S(n,t) being set to zero, and the resulting time-varying noise value (D(t)=R'($n_{IP}$,t)) may be determined from Equation 2.

The static, spatial-varying noise (B(n) or B($n_{IP}$)) and the static spatial-varying gain (G(n) or G($n_{IP}$)) in Equations 1 and 2 may be determined as illustrated in FIG. 10. For example, during manufacturing of the electronic device, the static noise and gain may be measured and determined for one or more sensing points 1001 with the display 607 off. Excitation signals may be applied to the sensing point excitation nodes 1003 and the sensing point output nodes 1005 may be scanned to detect output signals, which are then converted to digital values by the ADC unit 606 or another analog-to-digital conversion device that may be incorporated into a factory test system. Since the display 607 is off and there is no touch input during determination of the static noise and gain, D(t) and S(n,t) are both zero in Equation 1 and the measured value is simply B(n) at the particular sensing point. The variation of B(n) across all the sensing points enables the determination of the static gain (G(n)), where the measured value of B(n) at a select one of the sensing points (e.g., the sensing point at $n_0$=$X_0$,$Y_0$) is used as a baseline from which the static gain is determined for the remaining sensing points. Once determined, the static noise and gain values are stored in the memory 603 of the electronic device 600 (e.g., as part of the touch input determination instructions 615) for use by the processing device 601 in determining a touch input.

In an embodiment in which one or more input-protected sensing points are not utilized, the processing unit 601 may determine the time-varying noise based on the capacitance values determined in block 905. In one such embodiment, the processing unit 601 normalizes (907) the sensed capacitance values to account for the static, spatial-varying noise and the static, spatial-varying gain, which may have been predetermined and stored in the device memory 603 as detailed above. In one embodiment, the processing unit 601 may normalize the sensed capacitance values by subtracting a corresponding static noise value from each of the sensed values and dividing each of the produced differences (e.g., R(n,t)−B(n)) by a corresponding static gain value. For example, the normalized value at time t and at a particular sensing point located at position n of the touch panel system 605 (R'(n,t)) may be represented by the following equation:

$$R'(n,t)=[R(n,t)-B(n)]/G(n). \quad \text{(Equation 6)}$$

After the sensed values have been normalized, the processing unit 601 may determine (909) an average of the normalized values (AvgR'(n,t)) as a baseline for detecting whether a touch input is present. The average value may be represented by the following equation:

$$AvgR'(n,t)=\Sigma R'(n,t)/N=\Sigma S(n,t)/N+\Sigma D(t)/N, \quad \text{(Equation 7)}$$

where N is a total quantity of the plurality of sensing points and R'(n,t) is determined and summed for all of the sensing points.

Upon determining the average of the normalized values, the processing unit 601 may then proceed to compare (911) each of the normalized values (R'(n,t)) to the average value (AvgR'(n,t)). Depending upon the results of the comparisons, the processing unit 601 may determine whether a touch input is present. For example, the processing unit may determine (913) whether the particular normalized value is greater than the average value by a predetermined threshold or less than the average value by another predetermined threshold, where evaluating whether to detect for a greater value or a lesser value depends on the configuration of the touch panel system 605. If the sensing points of the touch panel system 605 are configured to detect self-capacitance, the processing unit 601 may determine (913) whether the particular normalized value is greater than the average value by a predetermined threshold. In this case, the processing unit 601 may determine that a touch input 1101 is present if there are normalized values that exceed the average value by at least the predetermined threshold (which may be zero). On the other hand, if the sensing points of the touch panel system 605 are configured to detect mutual capacitance, the processing unit 601 may determine (913) whether the particular normalized value is less than the average value by a predetermined threshold. In this case, the processing unit 601 may determine that a touch input 1101 is present if there are normalized values that are less than the average value by at least the corresponding predetermined threshold (which may be zero).

When the processing unit 601 determines, based on the comparison results, that a touch input is present, the processing unit 601 excludes (915) the normalized value associated with each sensing point indicating the presence of a touch input from a subset used for determining the time-varying noise value. For example, where the touch panel system 605 detects self-capacitance, the processing unit 601 may exclude all normalized values that are greater than the average value by a corresponding threshold. By contrast, where the touch panel system 605 detects mutual capacitance, the processing unit 601 may exclude all normalized values that are less than the average value by a corresponding threshold.

Additionally, upon determining that a touch input is present based on the comparison results, the processing unit 601 may temporarily slow (917) operation of any electronic noise sources in the electronic device 600 that are under the control of the processing unit 601 so as to cause the time-varying noise produced by them to be substantially less time-dependent. For example, where the touch panel system 605 and the display 607 form a touchscreen display 703, the processing unit 601 may temporarily slow operation of (and changes to) the display panel 617 so as to cause noise produced by the display panel 617 to vary less with time. In one embodiment, the processing unit 601 may temporarily freeze or halt operation of the display panel 617 or a portion thereof during the re-scanning or next scanning of the sensing points to facilitate more rapid and accurate determination of the time-varying noise.

For example, as illustrated in FIG. 11, the normalized sensed value 1107 for sensing point 1103 (i.e., the sensing point at position $X_c, Y_d$ of the touch panel system 605) may be such that, when the value is compared to the average value, the processing unit 601 determines that a touch input 1101 is likely present at or around the sensing point 1103. In such a case, the processing unit 601 may temporarily freeze display activity on the display panel 617 over the entire display panel 617 or over a portion of the display panel 617 corresponding to a predetermined area 1109 surrounding the sensing point 1103 or points at which the touch input was likely detected (i.e., around the estimated location of the touch input). Because the processing unit 601 knows the location of the sensing point currently being processed, the processing unit 601 also knows the general area in which the touch input is likely present. Accordingly, the processing unit 601 can limit the area of the display panel 617 that is temporarily frozen in order to accomplish the objective of rapidly and accurately determining the time-varying noise without significantly impacting display operation. When a touch input is detected and the operation of the electronic noise source(s) slowed, the processing unit 601 may re-process the sensing points to determine the sensed capacitance values, normalize the sensed capacitance values to account for static gain and noise, average the normalized capacitance values, and compare the newly normalized values to the average value while the operation of the noise source is slowed or halted to obtain more accurate determinations of the time-varying noise parameters.

Figure 12:
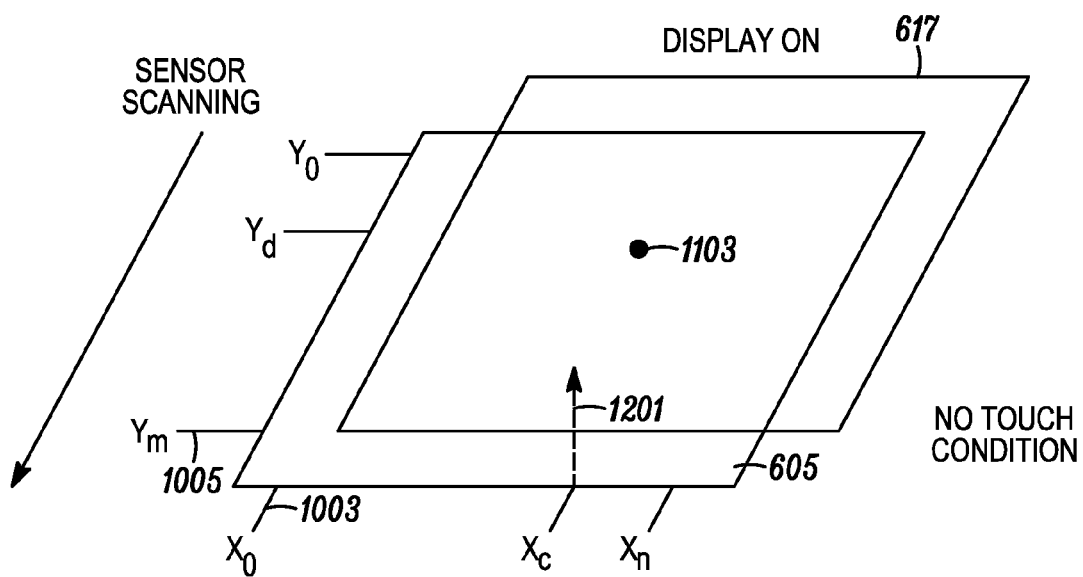
FIG. 12 illustrates determination of an absence of a touch input on the touchscreen display of FIG. 10 when a display panel of the touchscreen display is on, in accordance with a further embodiment of the present invention.

When the comparison of the a normalized value to the average value does not indicate the presence of a touch input at a particular sensing point, the processing unit 601 adds (919) the normalized value for the sensing point to a subset of normalized values used for determining the time-varying noise. For example, as illustrated in FIG. 12, when there is no touch input at sensing point 1103 and the touch panel system 605 is configured to detect self-capacitance, the normalized sensed value 1201 for sensing point 1103 is less than the normalized sensed value 1107 when a touch input is present. In such a case where the normalized sensed value 1201 is less than the average value by at least a predetermined threshold, the processing unit 601 determines that no touch input is present and adds the normalized value for the sensing point 1103 into the subset of normalized values used for determining the time-varying noise.

In one embodiment, the processing unit 601 averages the subset of normalized values (i.e., only those normalized values that are not likely associated with a touch input) and determines (921) the time-varying noise value based on the subset average. For example, the time-varying noise value (D(t)) may be determined in this case as:

$$D(t)=\Sigma R''(n,t)/N', \qquad \text{(Equation 8)}$$

where N' is a quantity of the subset of normalized values, which is less than or equal to the total quantity of normalized values (i.e., the total quantity of sensing points). Additionally, R''(n,t)=[R(n,t)−B(n)]/G(n) and is determined only for those sensing points for which a touch input is absent based on the results of the comparisons of the normalized sensed values to the average of the normalized sensed values.

Once the time-varying noise value has been determined, the processing unit 601 may filter (923) the time-varying noise value from each sensed capacitance value to facilitate determination of a touch input, when present. For example, referring back to Equation 1, the touch input value is represented as S(n,t) and may be determined by filtering the time-varying and static noise (G(n)*D(t) and B(n), respectively) from the sensed capacitance value (R(n,t)) and dividing the filtered result by the static gain (G(n)) at the particular sensing point, such that the touch input value is determined in accordance with Equation 5 above. Where a touch input is absent from a particular sensing point, the touch input value as determined by Equation 5 will be substantially zero or at least below a threshold established to indicate an absence of touch input.

The present invention encompasses an electronic device and a method for determining a touch input applied to a capacitive touch panel system incorporated within an electronic device. With this invention, touch inputs to capacitive touch panel systems may be more rapidly and accurately detected in the presence of time-varying noise, such as the noise produced by a display panel positioned in close proximity to the touch panel system in a touchscreen display. While prior art touch panel noise filtering approaches have focused on removal of static noise, such approaches are generally ineffective for isolating and removing time-varying noise. By contrast, the device and method disclosed herein provide a mechanism for filtering time-varying noise in touch panel systems to improve the signal-to-noise ratios in such systems and improve the accuracy of touch input determinations.

As detailed above, embodiments of the present invention reside primarily in combinations of method steps and/or apparatus components related to determining a touch input applied to a capacitive touch panel system incorporated within an electronic device. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the electronic device 600 described herein may be comprised of one or more conventional processors and unique stored program instructions that control the processor(s) to implement, in conjunction with certain non-processor circuits, some, most, or all of the functions of the electronic device 300 and its operational methods as described herein. The non-processor circuits may include, but are not limited to, storage devices, such as the internal memory 603, the display 605 and the touch panel system 607 described above, as well as filters, display drivers, clock circuits, power source circuits, and various other non-processor circuits. As such, the functions of these non-processor circuits may be interpreted as steps of a method to determine a touch input applied to a capacitive touch panel system incorporated within an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for an electronic device to determine a touch input applied to a capacitive touch panel system of the electronic device, the capacitive touch panel system including a plurality of sensing points, the method comprising:
   detecting capacitance at each sensing point of the plurality of sensing points to produce a plurality of sensed values;
   adjusting at least one sensed value of the plurality of sensed values to account for static, spatial-varying noise to produce at least one adjusted value;
   determining a time-varying noise value corresponding to a time-varying noise based on the at least one adjusted value, the time-varying noise affecting the capacitive touch panel system;
   adjusting at least one sensed value of the plurality of sensed values based at least on the time-varying noise value to produce at least one noise-adjusted value; and
   determining the touch input based on the at least one noise-adjusted value.

2. The method of claim 1, wherein the plurality of sensing points includes one or more input-protected sensing points that are protected from application of the touch input, and wherein adjusting at least one sensed value of the plurality of sensed values to account for static, spatial-varying noise and determining a time-varying noise value corresponding to a time-varying noise based on the at least one adjusted value comprise:
   adjusting one or more sensed values for the one or more input-protected sensing points to account for static, spatial-varying noise to produce the at least one adjusted value; and
   determining the time-varying noise value from the at least one adjusted value.

3. The method of claim 1, wherein adjusting at least one sensed value of the plurality of sensed values to account for static, spatial-varying noise comprises:
   adjusting at least one sensed value of the plurality of sensed values to account for static, spatial-varying noise and static, spatial-varying gain to produce the at least one adjusted value.

4. The method of claim 3, wherein adjusting at least one sensed value of the plurality of sensed values to account for static, spatial-varying noise and static, spatial-varying gain comprises:
adjusting the plurality of sensed values to account for static, spatial-varying noise and static, spatial-varying gain to produce a plurality of adjusted values;
determining an average of the plurality of adjusted values to produce an average value;
comparing each adjusted value of the plurality of adjusted values to the average value to produce a plurality of comparison results; and
determining a subset of the plurality of adjusted values based on the plurality of comparison results.

5. The method of claim 4, wherein adjusting at least one sensed value of the plurality of sensed values based at least on the time-varying noise value comprises:
filtering the time-varying noise value from each of the plurality of sensed values to produce the at least one noise-adjusted value.

6. The method of claim 4, wherein determining a time-varying noise value corresponding to a time-varying noise based on the at least one adjusted value comprises:
determining an average of the subset of adjusted values to produce the time-varying noise value.

7. The method of claim 3, wherein adjusting at least one sensed value of the plurality of sensed values to account for static, spatial-varying noise and static, spatial-varying gain comprises:
normalizing the at least one sensed value to account for static, spatial-varying noise and static, spatial-varying gain to produce the at least one adjusted value.

8. The method of claim 1, wherein the plurality of sensing points includes a plurality of excitation nodes and a plurality of output nodes and wherein detecting capacitance at each sensing point of the plurality of sensing points comprises:
applying a plurality of excitation signals to the plurality of excitation nodes;
scanning the plurality of output nodes to detect a corresponding plurality of output signals responsive to the plurality of excitation signals; and
determining the capacitance at each sensing point based on a corresponding output signal of the plurality of output signals.

9. The method of claim 8, wherein applying a plurality of excitation signals to the plurality of excitation nodes comprises:
applying the plurality of excitation signals to the plurality of excitation nodes substantially simultaneously.

10. The method of claim 8, wherein scanning the plurality of output nodes comprises:
scanning the plurality of output nodes in one of a predetermined order and a random order to detect the corresponding plurality of output signals responsive to the plurality of excitation signals.

11. The method of claim 8, wherein scanning the plurality of output nodes comprises:
scanning the plurality of output nodes substantially simultaneously to detect the corresponding plurality of output signals responsive to the plurality of excitation signals.

12. The method of claim 1, wherein the electronic device includes at least one electronic noise source and wherein the time-varying noise affecting the capacitive touch panel system results at least in part from operation of the at least one electronic noise source, the method further comprising:
determining, based on the at least one adjusted value, whether the touch input is likely present;
responsive to a determination that the touch input is likely present, slowing operation of the at least one electronic noise source on a temporary basis; and
while operation of the at least one electronic noise source is slowed, repeating operations of detecting capacitance at each sensing point of the plurality of sensing points to produce the plurality of sensed values and adjusting at least one sensed value of the plurality of sensed values to account for static, spatial-varying noise to produce the at least one adjusted value.

13. The method of claim 12, wherein the at least one electronic noise source includes a display panel, wherein the capacitive touch panel system and the display panel form a touchscreen display, and wherein slowing operation of the at least one electronic noise source on a temporary basis comprises:
temporarily freezing operation of at least part of the display panel.

14. A method for an electronic device to determine a touch input applied to a capacitive touch panel system of the electronic device so as to account for time-varying noise affecting the touch panel system, the touch panel system including a plurality of sensing points, the method comprising:
detecting a capacitance at each sensing point of the plurality of sensing points to produce a plurality of sensed values;
normalizing each of the plurality of sensed values to account for static, spatial-varying noise and static, spatial-varying gain to produce a plurality of normalized values;
determining an average of the plurality of normalized values to produce an average value;
comparing each of the plurality of normalized values to the average value to produce a plurality of comparison results;
determining a subset of the plurality of normalized values based on the plurality of comparison results;
determining an average of the subset of normalized values to produce a time-varying, common mode noise value; and
determining the touch input based on filtering of the time-varying, common mode noise value from each of the plurality of sensed values.

15. The method of claim 14, wherein the time-varying noise affecting the touch panel system results at least in part from operation of at least one electronic noise source, the method further comprising:
determining, based on the plurality of comparison results, whether the touch input is present;
responsive to determining that the touch input is present, slowing operation of the at least one electronic noise source on a temporary basis; and
while operation of the at least one electronic noise source is slowed and prior to determining the subset of normalized values, repeating the steps of detecting a capacitance at each sensing point of the plurality of sensing points, normalizing each of the plurality of sensed values, determining the average value, and comparing each of the plurality of normalized values to the average value.

16. The method of claim 15, wherein the at least one electronic noise source includes a display panel of the electronic device and wherein slowing operation of the at least one electronic noise source on a temporary basis comprises temporarily freezing operation of at least part of the display panel.

17. The method of claim 14, wherein determining whether the touch input is present comprises:
    determining whether at least one of the plurality of normalized values is greater than the average value by a predetermined threshold.

18. The method of claim 14, wherein determining whether the touch input is present comprises:
    determining whether at least one of the plurality of normalized values is less than the average value by a predetermined threshold.

19. The method of claim 14, wherein the plurality of sensing points includes a plurality of excitation nodes and a plurality of output nodes configured in a grid arrangement and wherein detecting a capacitance at each sensing point of the plurality of sensing points comprises:
    applying a plurality of excitation signals to the plurality of excitation nodes;
    scanning the plurality of output nodes to detect a corresponding plurality of output signals responsive to the plurality of excitation signals; and
    determining the capacitance at each sensing point based on a corresponding output signal of the plurality of output signals.

20. The method of claim 19, wherein scanning the plurality of output nodes comprises:
    scanning the plurality of output nodes in a predetermined order to detect the corresponding plurality of output signals responsive to the plurality of excitation signals.

21. The method of claim 19, wherein scanning the plurality of output nodes comprises:
    scanning the plurality of output nodes in a random order to detect the corresponding plurality of output signals responsive to the plurality of excitation signals.

22. The method of claim 19, wherein scanning the plurality of output nodes comprises:
    scanning the plurality of output nodes substantially simultaneously to detect the corresponding plurality of output signals responsive to the plurality of excitation signals.

23. The method of claim 14, wherein the capacitance detected at a particular time and at a particular sensing point of the plurality of sensing points is defined by the following equation:

$$R(n,t)=G(n)*S(n\cdot t)+G(n)*D(t)+B(n),$$

where
    n is a location of the particular sensing point in the touch panel system;
    t is the particular time;
    $R(n,t)$ is a sensed value corresponding to the capacitance detected at the particular sensing point at the particular time;
    $G(n)$ is static, spatial-varying gain at the location of the particular sensing point;
    $S(n,t)$ represents a touch input signal at the location of the particular sensing point at the particular time;
    $D(t)$ is a time-varying, common mode noise value at the particular time; and
    $B(n)$ is static, spatial-varying noise at the location of the particular sensing point.

24. The method of claim 23, wherein normalizing each of the plurality of sensed values comprises:
    subtracting corresponding static, spatial-varying noise from each of the plurality of sensed values to produce a plurality of differences, wherein each of the plurality of differences is represented by $R(n,t) -B(n)$ for the particular time and the particular sensing point; and
    dividing each of the plurality of differences by a corresponding static, spatial varying gain to produce the plurality of normalized values, wherein each of the plurality of normalized values is represented by $R'(n,t)=[R(n,t)-B(n)]/G(n)$ for the particular time and the particular sensing point.

25. The method of claim 24, wherein the average of the plurality of normalized values is determined by the following equation:

$$AvgR'(n,t)=\Sigma R'(n,t)/N=\Sigma S(n,t)/N+\Sigma D(t)/N,$$

where
    $AvgR'(n,t)$ is the average value; and
    N is a total quantity of the plurality of sensing points; and
    wherein $R'(n,t)$ is determined and summed for all of the plurality of sensing points.

26. The method of claim 25, wherein the average of the subset of normalized values is determined according to the following equation:

$$D(t)=\Sigma R''(n,t)/N',$$

where
    $D(t)$ is the time-varying, common mode noise value; and
    $N'$ is a quantity of the subset of normalized values and is less than or equal to N; and
wherein $R''(n,t) =[R(n,t) -B(n)]/G(n)$ and is determined only for sensing points of the plurality of sensing points for which a touch input is absent based on the plurality of comparison results.

27. An electronic device comprising:
    a capacitive touch panel system that includes a plurality of sensing points, at least some of the plurality of sensing points being operable to detect application of a touch input from a user of the electronic device;
    an analog-to-digital conversion (ADC) unit operably coupled to the plurality of sensing points for converting analog output signals from the plurality of sensing points to digital signal values; and
    a processing unit operably coupled to the ADC unit and operable in accordance with a set of operating instructions to:
        receive digital signal values from the ADC unit representing capacitances detected by the plurality of sensing points to produce a plurality of sensed values;
        adjust at least one sensed value of the plurality of sensed values to account for static, spatial-varying noise to produce at least one adjusted value;
        determine a time-varying noise value corresponding to a time-varying noise based on the at least one adjusted value, the time-varying noise affecting the capacitive touch panel system;
        adjust at least one sensed value of the plurality of sensed values based at least on the time-varying noise to produce at least one noise-adjusted value; and
        determine the touch input based on the at least one noise-adjusted value.

28. The electronic device of claim 27, wherein the processing unit is further operable in accordance with the set of operating instructions to adjust at least one sensed value of the plurality of sensed values to account for static, spatial-varying noise by:
    adjusting at least one sensed value of the plurality of sensed values to account for static, spatial-varying noise and static, spatial-varying gain to produce the at least one adjusted value.

29. The electronic device of claim 28, wherein the processing unit is further operable in accordance with the set of operating instructions to adjust at least one sensed value of the plurality of sensed values to account for static, spatial-varying noise and static, spatial-varying gain by:
   normalizing each of the plurality of sensed values to account for static, spatial-varying noise and static, spatial-varying gain to produce a plurality of normalized values.

30. The electronic device of claim 29, wherein the processing unit is further operable in accordance with the set of operating instructions to determine the time-varying noise affecting the capacitive touch panel system by:
   determining an average of the plurality of normalized values to produce an average value;
   comparing each of the plurality of normalized values to the average value to produce a plurality of comparison results;
   determining a subset of the plurality of normalized values based on the plurality of comparison results; and
   determining an average of the subset of normalized values to produce a time-varying noise value corresponding to the time-varying noise.

31. The electronic device of claim 30, further comprising:
at least one electronic noise source that is controllable by the processing unit, wherein the time-varying noise affecting the capacitive touch panel system results at least in part from operation of the at least one electronic noise source; and
wherein the processing unit is further operable in accordance with the set of operating instructions to:
   determine, based on the plurality of comparison results, whether the touch input is likely present;
   responsive to a determination that the touch input is likely present, slow operation of the at least one electronic noise source on a temporary basis; and
   while operation of the at least one electronic noise source is slowed and prior to determining the subset of normalized values, repeat operations of detecting a capacitance at each sensing point of the plurality of sensing points, normalizing each of the plurality of sensed values, determining the average value, and comparing each of the plurality of normalized values to the average value.

32. The electronic device of claim 31, wherein the at least one electronic noise source includes a display panel, wherein the capacitive touch panel system and the display panel form a touchscreen display, and wherein the processing unit is operable to slow operation of the at least one electronic noise source by temporarily freezing operation of at least part of the display panel.

33. The electronic device of claim 28, wherein the plurality of sensing points includes one or more input-protected sensing points that are protected from application of the touch input, and wherein the processing unit is operable in accordance with the set of operating instructions to adjust the at least one sensed value of the plurality of sensed values to account for static, spatial-varying noise and static, spatial-varying gain and determine the time-varying noise value by:
   adjusting one or more sensed values relating to the one or more input-protected sensing points to account for static, spatial-varying noise and static, spatial-varying gain to produce the at least one adjusted value; and
   determining the time-varying noise value from the at least one adjusted value.

34. The electronic device of claim 27, wherein the processing unit is further operable in accordance with the set of operating instructions to adjust at least one sensed value of the plurality of sensed values based at least on the time-varying noise by:
   filtering the time-varying noise value from each of the plurality of sensed values to produce the at least one noise-adjusted value.

35. The electronic device of claim 27, further comprising:
at least one electronic noise source that is controllable by the processing unit, wherein the time-varying noise affecting the capacitive touch panel system results at least in part from operation of the at least one electronic noise source; and
wherein the processing unit is further operable in accordance with the set of operating instructions to:
   determine, based on the at least one adjusted value, whether the touch input is likely present;
   responsive to a determination that the touch input is likely present, slow operation of the at least one electronic noise source on a temporary basis; and
   while operation of the at least one electronic noise source is slowed, repeat operations of detecting a capacitance at each sensing point of the plurality of sensing points to produce the plurality of sensed values and adjusting at least one sensed value of the plurality of sensed values to account for static, spatial-varying noise to produce the at least one adjusted value.

36. The electronic device of claim 35, wherein the at least one electronic noise source includes a display panel, wherein the capacitive touch panel system and the display panel form a touchscreen display, and wherein the processing unit is operable to slow operation of the at least one electronic noise source by temporarily freezing operation of at least part of the display panel.

37. The electronic device of claim 27, wherein the plurality of sensing points includes a plurality of excitation nodes and a plurality of output nodes, wherein the ADC unit is coupled to the plurality of output nodes, and wherein the processing unit is further operable in accordance with the set of operating instructions to:
   apply a plurality of excitation signals to the plurality of excitation nodes; and
   cause the ADC unit to scan the plurality of output nodes to detect a corresponding plurality of output signals responsive to the plurality of excitation signals.

38. The electronic device of claim 37, wherein the processing unit is operable in accordance with the set of operating instructions to apply a plurality of excitation signals to the plurality of excitation nodes by:
   applying the plurality of excitation signals to the plurality of excitation nodes substantially simultaneously.

39. The electronic device of claim 37, wherein the processing unit is operable in accordance with the set of operating instructions to cause the ADC unit to scan the plurality of output nodes by:
   causing the ADC unit to scan the plurality of output nodes substantially simultaneously to detect the corresponding plurality of output signals responsive to the plurality of excitation signals.

40. A method for an electronic device to determine a touch input applied to a capacitive touch panel system of the electronic device, the capacitive touch panel system including a plurality of sensing points, the method comprising:
   detecting capacitance at each of the plurality of sensing points to produce a plurality of sensed values;
   detecting time-varying noise at one or more input-protected sensing points of the plurality of sensing points, wherein the one or more input-protected sensing points are protected from application of the touch input and wherein the time-varying noise affects the capacitive touch panel system;

adjusting at least one sensed value of the plurality of sensed values based at least on the time-varying noise to produce at least one noise-adjusted value; and determining the touch input based on the at least one noise-adjusted value.

41. An electronic device comprising:

a capacitive touch panel system that includes a plurality of sensing points, the plurality of sensing points including a plurality of input-accepting sensing points operable to detect application of a touch input from a user of the electronic device and one or more input-protected sensing points that are protected from application of the touch input;

an analog-to-digital conversion (ADC) unit operably coupled to the plurality of sensing points for converting analog output signals from the plurality of sensing points to digital signal values; and a processing unit operably coupled to the ADC unit and operable in accordance with a set of operating instructions to:

receive digital signal values from the ADC unit representing capacitances detected by the plurality of sensing points to produce a plurality of sensed values;

detect time-varying noise at the one or more input-protected sensing points, the time-varying noise affecting the capacitive touch panel system adjust at least one sensed value of the plurality of sensed values based at least on the time-varying noise to produce at least one noise-adjusted value; and determine the touch input based on the at least one noise-adjusted value.

* * * * *